(12) United States Patent
Gonion

(10) Patent No.: US 9,110,683 B2
(45) Date of Patent: Aug. 18, 2015

(54) PREDICTING BRANCHES FOR VECTOR PARTITIONING LOOPS WHEN PROCESSING VECTOR INSTRUCTIONS

(75) Inventor: Jeffry E. Gonion, Campbell, CA (US)

(73) Assignee: APPLE INC., Cupertino, CA (US)

( * ) Notice: Subject to any disclaimer, the term of this patent is extended or adjusted under 35 U.S.C. 154(b) by 741 days.

(21) Appl. No.: 13/414,606

(22) Filed: Mar. 7, 2012

(65) Prior Publication Data

US 2012/0166765 A1      Jun. 28, 2012

Related U.S. Application Data

(63) Continuation-in-part of application No. 13/343,619, filed on Jan. 4, 2012, which is a continuation-in-part of application No. 12/541,546, filed on Aug. 14, 2009, now Pat. No. 8,359,461.

(60) Provisional application No. 61/089,251, filed on Aug. 15, 2008.

(51) Int. Cl.
*G06F 9/38* (2006.01)
*G06F 9/30* (2006.01)
*G06F 9/45* (2006.01)
*G06F 9/32* (2006.01)

(52) U.S. Cl.
CPC ............ *G06F 8/4441* (2013.01); *G06F 9/3005* (2013.01); *G06F 9/30058* (2013.01); *G06F 9/30072* (2013.01); *G06F 9/30076* (2013.01); *G06F 9/325* (2013.01); *G06F 9/3804* (2013.01); *G06F 9/3836* (2013.01); *G06F 9/3838* (2013.01); *G06F 9/3844* (2013.01); *G06F 9/3861* (2013.01)

(58) Field of Classification Search
CPC combination set(s) only.
See application file for complete search history.

(56) References Cited

U.S. PATENT DOCUMENTS

| | | | |
|---|---|---|---|
| 5,381,536 A | 1/1995 | Phelps | |
| 5,781,752 A | 7/1998 | Moshovos | |
| 5,909,573 A * | 6/1999 | Sheaffer | 712/240 |
| 5,951,679 A * | 9/1999 | Anderson et al. | 712/241 |
| 5,953,241 A | 9/1999 | Hansen | |
| 5,978,909 A * | 11/1999 | Lempel | 712/240 |
| 6,115,808 A | 9/2000 | Arora | |
| 6,295,599 B1 | 9/2001 | Hansen | |
| 6,308,250 B1 | 10/2001 | Klausler | |
| 6,584,482 B1 | 6/2003 | Hansen | |
| 6,622,240 B1 * | 9/2003 | Olson et al. | 712/233 |
| 6,643,765 B1 | 11/2003 | Hansen | |
| 6,725,356 B2 | 4/2004 | Hansen | |
| 6,941,444 B2 * | 9/2005 | Fong | 711/214 |
| 6,988,190 B1 * | 1/2006 | Park | 712/241 |
| 7,213,131 B2 | 5/2007 | Hansen | |
| 7,216,217 B2 | 5/2007 | Hansen | |

(Continued)

*Primary Examiner* — Eric Coleman
(74) *Attorney, Agent, or Firm* — Park, Vaughan, Fleming & Dowler LLP; Anthony P. Jones

(57) ABSTRACT

While fetching the instructions from a loop in program code, a processor calculates a number of times that a backward-branching instruction at the end of the loop will actually be taken when the fetched instructions are executed. Upon determining that the backward-branching instruction has been predicted taken more than the number of times that the branch instruction will actually be taken, the processor immediately commences a mispredict operation for the branch instruction, which comprises: (1) flushing fetched instructions from the loop that will not be executed from the processor, and (2) commencing fetching instructions from an instruction following the branch instruction.

21 Claims, 5 Drawing Sheets

(56) References Cited

U.S. PATENT DOCUMENTS

| | | |
|---|---|---|
| 7,260,708 B2 | 8/2007 | Hansen |
| 7,301,541 B2 | 11/2007 | Hansen |
| 7,353,367 B2 | 4/2008 | Hansen |
| 7,430,655 B2 | 9/2008 | Hansen |
| 7,464,252 B2 | 12/2008 | Hansen |
| 7,509,366 B2 | 3/2009 | Hansen |
| 7,516,308 B2 | 4/2009 | Hansen |
| 7,653,806 B2 | 1/2010 | Hansen |
| 7,660,972 B2 | 2/2010 | Hansen |
| 7,660,973 B2 | 2/2010 | Hansen |
| 7,730,287 B2 | 6/2010 | Hansen |
| 7,873,817 B1 * | 1/2011 | Aloni et al. .................. 712/235 |
| 2007/0220239 A1 * | 9/2007 | Dieffenderfer et al. ....... 712/240 |

* cited by examiner

PREDICTING BRANCHES FOR VECTOR PARTITIONING LOOPS WHEN PROCESSING VECTOR INSTRUCTIONS

RELATED APPLICATIONS

This application is a continuation in part of, and hereby claims priority under 35 U.S.C. §120 to, pending U.S. patent application Ser. No. 13/343,619, entitled "Predicate Count and Segment Count Instructions for Processing Vectors," by inventor Jeffry E. Gonion, filed 4 Jan. 2012. This application is also a continuation in part of, and hereby claims priority under 35 U.S.C. §120 to, pending U.S. patent application Ser. No. 12/541,546, entitled "Running-Shift Instructions for Processing Vectors," by inventors Jeffry E. Gonion and Keith E. Diefendorff, filed 14 Aug. 2009. This application further claims priority under 35 U.S.C. §120 to U.S. provisional patent application No. 61/089,251, entitled "Macroscalar Processor Architecture," by inventor Jeffry E. Gonion, filed 15 Aug. 2008, to which the parent application Ser. Nos. 12/541,546 and 13/343,619 also claim priority. These applications are each herein incorporated by reference.

This application is related to: (1) pending application Ser. No. 12/419,629, entitled "Method and Apparatus for Executing Program Code," by inventors Jeffry E. Gonion and Keith E. Diefendorff, filed on 7 Apr. 2009; (2) pending application Ser. No. 12/419,644, entitled "Break, Pre-Break, and Remaining Instructions for Processing Vectors," by inventors Jeffry E. Gonion and Keith E. Diefendorff, filed on 7 Apr. 2009; (3) pending application Ser. No. 12/419,661, entitled "Check-Hazard Instructions for Processing Vectors," by inventors Jeffry E. Gonion and Keith E. Diefendorff, filed on 7 Apr. 2009; (4) pending application Ser. No. 12/495,656, entitled "Copy-Propagate, Propagate-Post, and Propagate-Prior Instructions For Processing Vectors," by inventors Jeffry E. Gonion and Keith E. Diefendorff, filed on 30 Jun. 2009; (5) pending application Ser. No. 12/495,643, entitled "Shift-In-Right Instructions for Processing Vectors," by inventors Jeffry E. Gonion and Keith E. Diefendorff, filed on 30 Jun. 2009; (6) pending application Ser. No. 12/495,631, entitled "Increment-Propagate and Decrement-Propagate Instructions for Processing Vectors," by inventors Jeffry E. Gonion and Keith E. Diefendorff, filed on 30 Jun. 2009; (7) pending application Ser. No. 12/541,505, entitled "Running-Sum Instructions for Processing Vectors," by inventors Jeffry E. Gonion and Keith E. Diefendorff, filed on 14 Aug. 2009; and (8) pending application Ser. No. 12/541,526, entitled "Running-AND, Running-OR, Running-XOR, and Running-Multiply Instructions for Processing Vectors" by inventors Jeffry E. Gonion and Keith E. Diefendorff, filed on 14 Aug. 2009.

This application is also related to: (1) pending application Ser. No. 12/873,043, entitled "Running-Min and Running-Max Instructions for Processing Vectors," by inventors Jeffry E. Gonion and Keith E. Diefendorff, filed 31 Aug. 2010; (2) pending application Ser. No. 12/873,063, entitled "Non-Faulting and First-Faulting Instructions for Processing Vectors," by inventors Jeffry E. Gonion and Keith E. Diefendorff, filed 31 Aug. 2010; (3) pending application Ser. No. 12/873,074, entitled "Vector Test Instruction for Processing Vectors" by inventors Jeffry E. Gonion and Keith E. Diefendorff, filed 31 Aug. 2010; (4) pending application Ser. No. 12/907,471, entitled "Select First and Select Last Instructions for Processing Vectors," by inventors Jeffry E. Gonion and Keith E. Diefendorff, filed 19 Oct. 2010; (5) pending application Ser. No. 12/907,490, entitled "Actual Instruction and Actual-Fault Instructions for Processing Vectors," by inventors Jeffry E. Gonion and Keith E. Diefendorff, filed 19 Oct. 2010; (6) pending application Ser. No. 12/977,333, entitled "Remaining Instruction for Processing Vectors," by inventors Jeffry E. Gonion and Keith E. Diefendorff, filed 23 Dec. 2010; (7) pending application Ser. No. 13/006,243, entitled "Remaining Instruction for Processing Vectors," by inventors Jeffry E. Gonion and Keith E. Diefendorff, filed 13 Jan. 2011; (8) pending application Ser. No. 13/189,140, entitled "GetFirst and AssignLast Instructions for Processing Vectors," by inventors Jeffry E. Gonion and Keith E. Diefendorff, filed 22 Jul. 2011; (9) pending application Ser. No. 13/188,737, entitled "Running Subtract and Running Divide Instructions for Processing Vectors," by inventors Jeffry E. Gonion and Keith E. Diefendorff, filed 22 Jul. 2011; and (10) pending application Ser. No. 13/291,931, entitled "Vector Index Instruction for Processing Vectors," by inventor Jeffry E. Gonion and Kieth E. Diefendorff, filed 8 Nov. 2011.

This application is also related to: (1) pending application Ser. No. 12/237,212, entitled "Conditional Data-Dependency Resolution in Vector Processors," by inventors Jeffry E. Gonion and Keith E. Diefendorff, filed 24 Sep. 2008; (2) pending application Ser. No. 12/237,196, entitled "Generating Stop Indicators Based on Conditional Data Dependency in Vector Processors," by inventors Jeffry E. Gonion and Keith E. Diefendorff, filed 24 Sep. 2008; (3) pending application Ser. No. 12/237,190, entitled "Generating Predicate Values Based on Conditional Data Dependency in Vector Processors," by inventors Jeffry E. Gonion and Keith E. Diefendorff, filed 24 Sep. 2008; (4) application Ser. No. 11/803,576, entitled "Memory-Hazard Detection and Avoidance Instructions for Vector Processing," by inventors Jeffry E. Gonion and Keith E. Diefendorff, filed 14 May 2007, which has been issued as U.S. Pat. No. 8,019,976; and (5) pending application Ser. No. 13/224,170, entitled "Memory-Hazard Detection and Avoidance Instructions for Vector Processing," by inventors Jeffry E. Gonion and Keith E. Diefendorff, filed 14 May 2007.

BACKGROUND

1. Field

The described embodiments relate to techniques for improving the performance of computer systems. More specifically, the described embodiments relate to predicting branches for vector partitioning loops when processing vector instructions.

2. Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code that has undergone only minor modifications, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY

The described embodiments comprise a processor that determines a mispredicted branch instruction for a loop (i.e., determines mispredicted backward-branching instruction for a vector partitioning loop). During operation, while fetching instructions from program code, the processor repeatedly, starting from an initial instruction in a loop in the program code, fetches instructions from the loop, and, upon fetching a branch instruction from the loop that, when taken, causes the processor to branch back to the initial instruction, increments a branch instruction counter and predicts the branch instruction as taken, which causes the processor to return to the initial instruction and continue fetching instructions from the loop. While fetching the instructions from the loop, the processor calculates a number of times that the branch instruction will actually be taken when the fetched instructions are executed. Upon determining that the branch instruction counter is greater than the number of times that the branch instruction will actually be taken, the processor immediately commences a mispredict operation for the branch instruction, which comprises: (1) flushing fetched instructions from the loop that will not be executed from the processor, and (2) commencing fetching instructions from an instruction following the branch instruction.

In some embodiments, the processor places the fetched instructions in one or more issue queues, wherein instructions are buffered in the one or more issue queues before being issued for execution. In these embodiments, flushing fetched instructions from the loop that will not be executed from the processor comprises flushing instructions from at least one of the one or more issue queues and clearing other instruction-tracking mechanisms in the processor after a first instance in the issue queue of the branch instruction that will not be taken.

In some embodiments, when calculating the number of times that the branch instruction will actually be taken, the processor receives a dependency index vector (DIV) for the loop in the program code and executes a SegCount instruction with the DIV as an input. The output of the SegCount instruction indicates number of times that the branch instruction will actually be taken.

In some embodiments, while fetching instructions, the processor encounters a SegCount instruction. Based upon encountering the SegCount instruction, the processor determines that it is about to, starting from the initial instruction, commence fetching instructions from the loop. The processor then configures itself to increment the branch instruction counter upon fetching a branch instruction that branches backward in the program code.

In some embodiments, when immediately commencing the mispredict operation for the branch instruction, the processor is configured to commence the mispredict operation without executing the branch instruction to determine that the branch was mispredicted.

In some embodiments, when flushing fetched instructions from the loop that will not be executed from the processor, the processor is configured to determine a location of a first mispredicted branch instruction within the processor. The processor then flushes the first mispredicted branch instruction and any instructions fetched after the first mispredicted branch instruction from the processor. In these embodiments, flushing the instructions comprises deleting, invalidating, or ignoring the flushed instructions within the processor.

In some embodiments, when commencing fetching instructions from the instruction following the branch instruction, the processor is configured to update a program counter from an initial value to the value where the instruction following the branch instruction is located and use the updated program counter to fetch subsequent instructions.

In some embodiments, upon determining that the branch instruction counter is less than the number of times that the branch instruction will actually be taken, the processor is configured to continue to fetch instructions from the loop in program code.

BRIEF DESCRIPTION OF THE FIGURES

In the figures, like reference numerals refer to the same figure elements.

DETAILED DESCRIPTION

Figure 1:
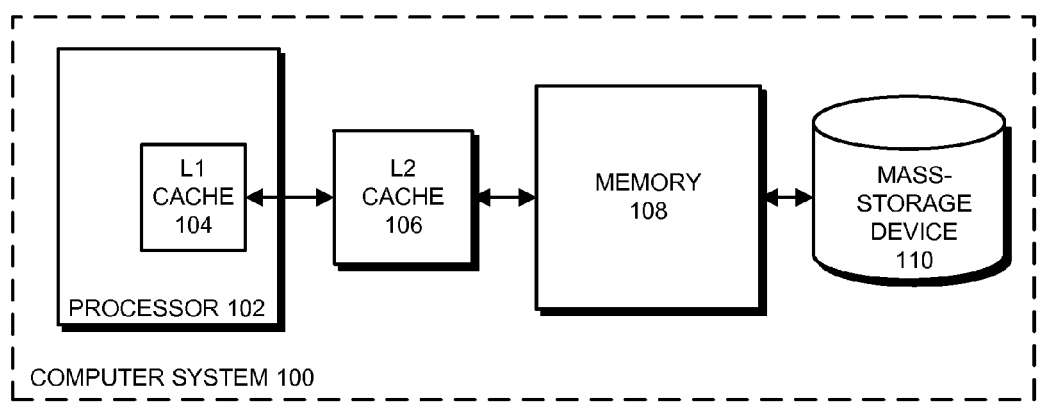
FIG. 1 presents a block diagram of a computer system in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, such as flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), and/or other mediums capable of storing data structures or code. Note that in the described embodiments, the computer-readable storage medium does not include non-statutory computer-readable storage mediums such as transitory signals.

The methods and processes described in this detailed description can be included in one or more hardware modules. For example, the hardware modules can include, but are not limited to, processors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When computer system (e.g., a processing subsystem in the computer system) reads and executes the code and/or data stored on the computer-readable storage medium, the computer system performs the methods and processes embodied as data structures and code and stored within the computer-readable storage medium.

In the following description, we refer to "some embodiments." Note that "some embodiments" describes a subset of all of the possible embodiments, but does not always specify the same subset of the embodiments.

Macroscalar Architecture

The embodiments described herein are based in part on the Macroscalar Architecture that is described in U.S. patent application Ser. No. 13/343,619, entitled "Predicate Count and Segment Count Instructions for Processing Vectors," by inventor Jeffry E. Gonion, filed 4 Jan. 2012 (hereinafter "the '619 application"), the contents of which are (as described above) incorporated by reference.

As described in the '619 application, the described embodiments provide an instruction set and supporting hardware that allow compilers to generate program code for loops without completely determining parallelism at compile-time, and without discarding useful static analysis information. Specifically, these embodiments provide a set of instructions that do not mandate parallelism for loops but instead enable parallelism to be exploited at runtime if dynamic conditions permit. These embodiments thus include instructions that enable code generated by the compiler to dynamically switch between non-parallel (scalar) and parallel (vector) execution for loop iterations depending on conditions at runtime by switching the amount of parallelism used.

These embodiments provide instructions that enable an undetermined amount of vector parallelism for loop iterations but do not require that the parallelism be used at runtime. More specifically, these embodiments include a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, the described embodiments execute the two elements in parallel. In these embodiments, expressing program code in a vector-length agnostic format enables a broad range of vectorization opportunities that are not present in existing systems.

In the described embodiments, during compilation, a compiler first analyzes the loop structure of a given loop in program code and performs static dependency analysis. The compiler then generates program code that retains static analysis information and instructs processor 102 how to resolve runtime dependencies and process the program code with the maximum amount of parallelism possible. More specifically, the compiler provides vector instructions for performing corresponding sets of loop iterations in parallel, and provides vector-control instructions for dynamically limiting the execution of the vector instructions to prevent data dependencies between the iterations of the loop from causing an error (which can be called "vector partitioning"). This approach defers the determination of parallelism to runtime, where the information on runtime dependencies is available, thereby allowing the software and processor to adapt parallelism to dynamically changing conditions.

As described above, vectorized program code can comprise vector-control instructions and vector instructions forming a loop in the vectorized program code that performs vector operations based on a corresponding loop in program code. Although any number of vector-control instructions can be used, in some embodiments, the vector-control instructions include a GeneratePredicates instruction at or near the beginning of the loop, and a backward branching instruction at the end of the loop. The GeneratePredicates instruction determines which, if any, iterations from the program code loop can be executed in parallel (and hence the vector elements of the vector instructions that can be processed simultaneously). The backward branching instruction determines if one or more elements remain to be processed in the loop in the vectorized program code and, if so, takes the branch to return to an initial instruction in the loop (which can be the GeneratePredicates instruction). Otherwise, if no vector elements remain to be processed in the loop, execution can continue with the instruction after the backward branching instruction (i.e., the branch can be "not taken"). In some embodiments, the branch instruction is a BranchCarryClear instruction, which checks the carry flag (CF) to determine if the GeneratePredicates instruction indicates that there are more vector elements to be processed and either branches back to the GeneratePredicates instruction or falls through and thereby exits the loop. Hence, operating together, the control instruction and the branch instruction can perform the vector partitioning—for what is herein described as a "vector partitioning loop." Vector partitioning loops are described in more detail below.

Terminology

Throughout the description, we use the following terminology. These terms may be generally known in the art, but are described below to clarify the subsequent descriptions.

The term "active element," as used in this description to refer to one or more elements of a vector, indicates elements that are operated on during a given operation. Generally, the described embodiments enable a vector execution unit to selectively perform parallel operations on one or more available elements in a given vector in parallel. For example, an operation can be performed on only the first two of eight elements of the vector in parallel. In this case, the first two elements are "active elements," while the remaining six elements are "inactive elements." In the described embodiments, one or more other vectors can be used to determine which elements in a given operand vector are active (i.e., are to be operated on). For example, a "predicate vector" can include "active" elements that are used to determine which elements in the operand vector to perform operations on. In some embodiments, elements that contain data of a predetermined type are active elements (e.g., true, false, non-zero, zero, uppercase/lowercase characters, even/odd/prime numbers, vowels, whole numbers, etc.).

The terms "true" and "false" are used in this description to refer to data values (e.g., a data value contained in an element in a vector). Generally, in computer systems true and false are often represented by 1 and 0, respectively. In practice, a given embodiment could use any value to represent true and false, such as the number 55, or the letter "T."

Notation

In describing the embodiments in the instant application, we use the following formats for variables, which are vector quantities unless otherwise noted:

p5=a<b;

Elements of vector p5 are set to 0 or 1 depending on the result of the comparison operation a<b. Note that vector p5 can be a predicate vector that can be used to control the number of elements of one or more vector instructions that execute in parallel.

~p5; a=b+c;

Only elements in vector a designated by active (i.e., non-zero) elements in the predicate vector p5 receive the result of b+c. The remaining elements of a are unchanged. This operation is called "predication," and is denoted using the tilde ("~") before the predicate vector.

!p5; a=b+c;

Only elements in vector a designated by active (i.e., non-zero) elements in the predicate vector p5 receive the result of b+c. The remaining elements of a are set to zero. This operation is called "zeroing," and is denoted using the exclamation point ("!") before the predicate vector.

if (FIRST( )) goto . . . ; Also LAST( ), ANY( ), ALL( ), CARRY( ), ABOVE( ), or NONE( ), (where ANY( )==!NONE( ))

These instructions test the processor status flags and branch accordingly.

x+=VECLEN;

VECLEN is a value that communicates the number of elements per vector. The value is determined at runtime by the processor 102 (see FIG. 1), rather than being determined by the compiler/assembler.

//Comment

In a similar way to many common programming languages, the examples presented below use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors discussed herein are vectors of integers, but alternative embodiments support other data formats.

Instruction Definitions

The described embodiments comprise numerous instructions that can be used to perform vector partitioning as part of a vector partitioning loop. For example, the described embodiments comprise control instructions such as the ConditionalStop and GeneratePredicates instructions. The described embodiments also comprise backward branch instructions such as the BranchCarryClear instruction that can be used to branch back to an initial instruction in a vector partitioning loop. Moreover, the described embodiments can comprise vector instructions such as the SegCount instruction that are used to determine if a backward branch instruction has been mispredicted one or more times. This section provides a brief description of the ConditionalStop, GeneratePredicates, BranchCarryClear, and SegCount instructions to enable a clearer understanding of the described embodiments.

Although we provide brief descriptions of the ConditionalStop, GeneratePredicates, and SegCount instructions, the '619 application includes more detail about these instructions' operations and interactions with other instructions and operations. In addition, although the ConditionalStop, GeneratePredicates, and SegCount instructions are described as examples, the prediction operation in the described embodiments can be performed using any appropriate combination of vector control instructions and vector instructions. Moreover, although certain arrangements of instructions are used in describing the function of the ConditionalStop, GeneratePredicates, and SegCount instructions, a person of skill in the art will recognize that these concepts may be implemented using different arrangements or types of instructions without departing from the spirit of the described embodiments.

We describe these instructions using a signed-integer data type. However, in alternative embodiments, other data types or formats are used. Moreover, although Macroscalar instructions may take vector, scalar, or immediate arguments in practice, vector arguments are shown here.

For the purposes of explanation, the vector data type is defined as a C++ class containing an array v[ ] of elements that comprise the vector. Within these descriptions, the variable VECLEN indicates the size of the vector. In some embodiments, VECLEN is constant.

In the following examples, predication can be communicated to the instructions via two variables. The vector gPred is a "global" predicate vector that affects the instruction and/or the assignment of the result vector (i.e., some instructions may reference gPred to affect the operation of the instruction apart from the final assignment). If an instruction is not predicated, then all elements are considered active. (In this case, the vector gPred is assumed, and the assumed gPred contains all active values.) Additionally, some instructions can use a "local" or "control" vector to determine elements for which operations are performed.

Note that the format of the following instruction definitions is a statement of the instruction type followed by a description of the instruction that can include example code as well as one or more usage examples.

ConditionalStop

The ConditionalStop instruction evaluates a vector and identifies transitions between adjacent predicate elements that imply data dependencies between elements of the vector. The data dependencies for which the ConditionalStop instruction checks can be specified by a scalar parameter mode. The scalar parameter mode indicates any number of four possible transitions between true and false values of adjacent elements in predicate p that imply data dependencies. For example, in some embodiments, the parameter mode is a 4-bit field, the bits of which are defined as follows:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The 1-based (i.e., considering the vector as starting with element "1") element position corresponding to the iteration that generates the data that is depended upon is stored in the destination vector at the element position corresponding to the iteration that depends on the data. If no data dependency exists, a value of 0 is stored in the destination vector at that element. Note that the ConditionalStop instruction supports only zeroing; non-zeroing predication is illegal.

```
Vector ConditionalStop(Vector &p, int mode)
{
    Vector r = 0;
    for (int x=1; x<VECLEN; ++x) // Skip the first element
    {
        if (p.v[x-1] == 0 && p.v[x] == 0)
        {
            if (mode & kFF) r.v[x] = x;
        }
        else if (p.v[x-1] == 0 && p.v[x] == 1)
        {
            if (mode & kFT) r.v[x] = x;
        }
        else if (p.v[x-1] == 1 && p.v[x] == 0)
        {
            if (mode & kTF) r.v[x] = x;
        }
        else
        {
            if (mode & kTT) r.v[x] = x;
        }
    }
    return(r);
}
```

Example:
  !p0; a=ConditionalStop(b, kTF|kFT);
  On Entry:
  p0={0 0 1 1 1 1 0 0}
  a={9 9 9 9 9 9 9 9}
  b={0 1 0 1 1 0 1 0}
  On Exit: a={0 0 2 3 0 5 0 0}

GeneratePredicates

This instruction takes a dependency index vector, DIV, and generates predicates corresponding to the next group of elements that may safely be processed in parallel, given the previous group that was processed which is indicated by prev. If no elements of prev are active, predicates are generated for the first group of elements that may safely be processed in parallel. If prev indicates that the final elements of the vector have been processed, then a result vector of inactive predicates is returned.

The definition of GeneratePredicates follows. As shown below, in some embodiments, the instruction processes all elements equivalently; however, predication is performed by the assignment of the result, and should be considered an integral part of this instruction. (Note that GeneratePredicates uses the destination register as one of its inputs.)

```
Flags:  ZF - Set if no active elements are true.
        Cleared otherwise.
        SF/OF/PF - Indicates whether the
        First/Last/All active elements of the
        result are true
        CF - Indicates Last or None (CF = OF || ZF)
Vector GeneratePredicates(Vector &prev, Vector &index)
{
    Vector r = 0;
    int x, pos;
    for (pos=VECLEN-1; pos>=0; --pos)
        if (prev.v[pos])
            break;
    for (++pos; pos<VECLEN; ++pos) // start at next active position
        if (gPred.v[pos])
            break;
    for (x=pos; x<VECLEN; ++x)
    {
        if (index.v[x] > pos) // compare DIV (1-based) value to position (0-based)
            break;
        r.v[x] = 1;
    }
    VectorTest(r); // VectorTest is defined in the
    `619 application
    gCarry = gLast || gNone; // Sets the CF when
    there are no remaining elements to be processed or when the
    last element is being processed
        return(r);
}
```

Examples:
  ~p0; p1=GeneratePredicates(p1,ix);
  On Entry:
  p0={1 1 1 1 1 1 1 0}
  p1={0 0 0 0 0 0 0 0}
  ix={0 0 0 2 1 3 4 0}
  On Exit1: p1={1 1 1 0 0 0 0 0}
  On Entry: p1={1 1 1 0 0 0 0 0}
  On Exit2: p1={0 0 0 1 1 1 0 0}
  On Entry: p1={0 0 0 1 1 1 0 0}
  On Exit3: p1={0 0 0 0 0 0 1 0}

SegCount

This instruction analyzes an input vector such as a DIV to determine a number of times that a GeneratePredicates instruction would be executed to generate a full set of predicates using active elements of the input vector. During this process, the SegCount instruction determines a number of "segments" that can be used for performing one or more vector operations using one or more input vectors, where each segment is a portion (i.e., a set of one or more elements) of an input vector for which an operation can be safely performed in parallel (as indicated by a corresponding predicate vector generated by the GeneratePredicates instruction). Note that a predicate vector gPred (e.g., a global predicate vector) can be used to determine the active elements.

```
int SegCount(Vector &a)
{
    int x, pos, r;
    for(x=0; x<VECLEN; ++x) // Start at next active position
        if(gPred.v[x])
            break;
    r = 0;
    pos = x;
    if(x < VECLEN)
    {
        r = 1;
        for(; x<VECLEN; ++x)
        {
```

```
        if(gPred.v[x])
        {
            if(a.v[x] > pos) // Compare DIV
(1-based) value to position (0-based)
            {
                pos = x;
                ++r;
            }
        }
    }
}
return (r);
}
```

Examples:
~p0; r=SegCount(a);
On Entry:
r=0
p0={1 1 1 1 1 1 0 0}
a={1 1 2 2 2 4 5 1}
On Exit: r=3
!p0; r=SegCount(a);
On Entry:
r=0
p0={1 1 1 1 1 1 0 0}
a={1 1 2 2 2 4 5 1}
On Exit: r=3

BranchCarryClear

This instruction performs a comparison operation to determine if the carry flag (which can be set, for example, by a GeneratePredicates instruction) has been set. If the carry flag has not been set, the BranchCarryClear instruction branches to an instruction address indicated in the instruction, otherwise, the BranchCarryClear instruction falls through the branch and continues executing subsequent program code. In some cases, the branch can be backward in the program code (e.g., to a lower program counter), in which case the BranchCarryClear instruction can be generally referred to as a backwards branching instruction. Although the BranchCarryClear is described in general terms, the BranchCarryClear instruction can be implemented in any of a number of variants, e.g., variants that use an absolute address as the branch target, variants that use a relative branch, variants that use immediate values, etc.

Computer System

FIG. 1 presents a block diagram of a computer system 100 in accordance with the described embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

In some embodiments, the devices in the memory hierarchy (i.e., L1 cache 104, etc.) can access (i.e., read and/or write) multiple cache lines per cycle. These embodiments enable more effective processing of memory accesses that occur based on a vector of pointers or array indices to non-contiguous memory addresses. In addition, in some embodiments, the caches in the memory hierarchy are divided into a number of separate banks, each of which can be accessed in parallel. Banks within caches and parallel accesses of the banks are known in the art and hence are not described in more detail.

Computer system 100 can be incorporated into many different types of electronic devices. For example, computer system 100 can be part of a desktop computer, a laptop computer, a tablet computer, a server, a media player, an appliance, a cellular phone, a piece of testing equipment, a network appliance, a personal digital assistant (PDA), a hybrid device (i.e., a "smart phone"), or another electronic device.

Although we use specific components to describe computer system 100, in alternative embodiments, different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and mass-storage device 110.

Processor

Figure 2:
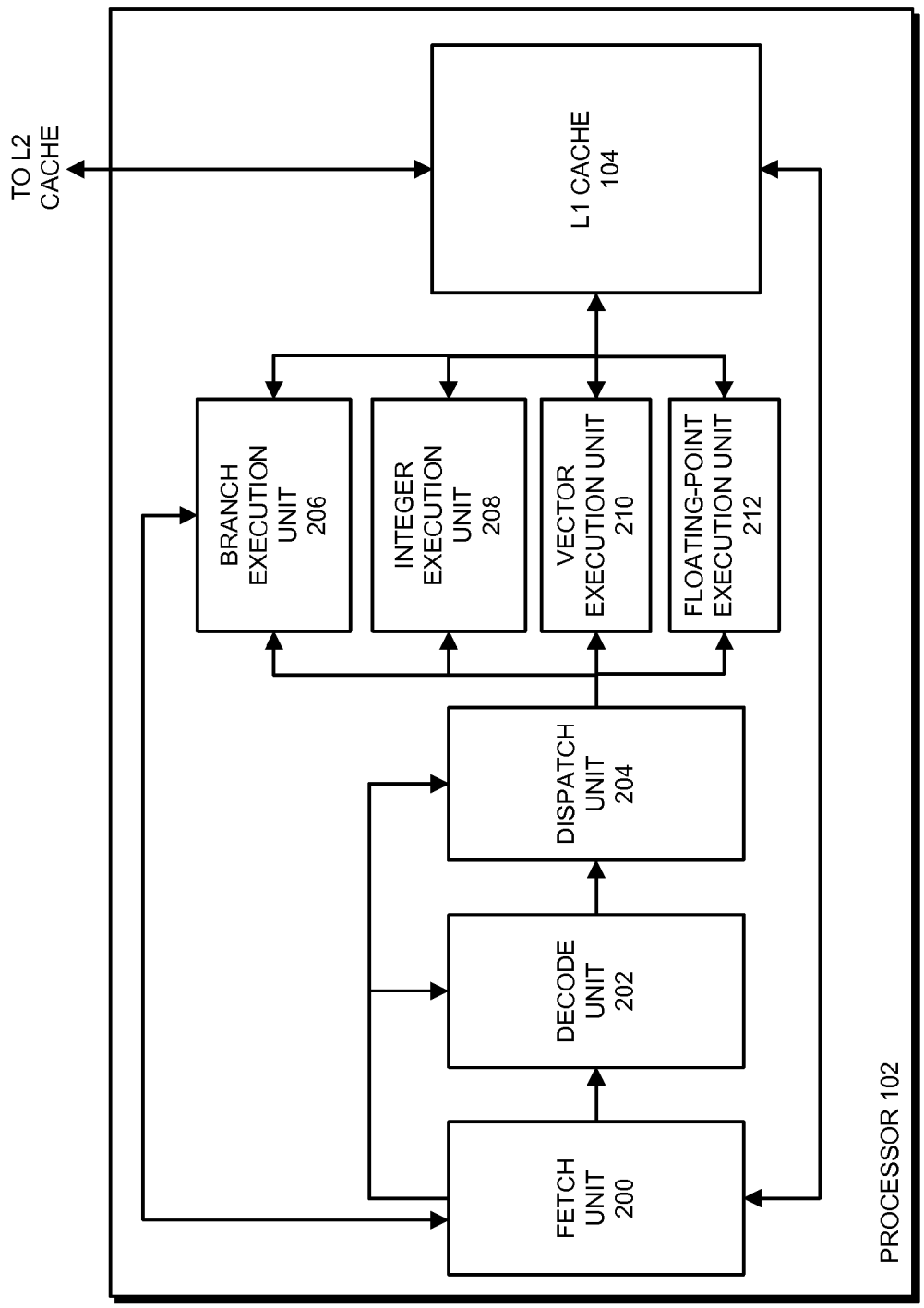
FIG. 2 presents an expanded view of a processor in accordance with the described embodiments.

FIG. 2 presents an expanded view of processor 102 in accordance with the described embodiments. As shown in FIG. 2, processor 102 includes L1 cache 104, fetch unit 200, decode unit 202, dispatch unit 204, branch execution unit 206, integer execution unit 208, vector execution unit 210, floating-point execution unit 212 (branch execution unit 206, integer execution unit 208, vector execution unit 210, and floating-point execution unit 212 as a group are interchangeably referred to as "the execution units").

Fetch unit 200 fetches instructions from the memory hierarchy in computer system 100 and forwards the fetched instructions to be decoded in decode unit 202 for eventual execution in the execution units. Generally, fetch unit 200 attempts to fetch instructions from the closest portion of the memory hierarchy first, and if the instruction is not found at that level of the memory hierarchy, proceeds to the next level in the memory hierarchy until the instruction is found. For example, in some embodiments, fetch unit can request instructions from L1 cache 104 (which can comprise a single physical cache for instructions and data, or can comprise physically separate instruction and data caches). Aside from the operations herein described, the operations of fetch units are generally known in the art and hence are not described in more detail.

In the described embodiments, fetch unit 200 can comprise one or more mechanisms for keeping track of backward-branching instructions to enable the described embodiments to determine when a backward-branching instruction in a vector partitioning loop has been mispredicted as taken one or more times. When such a misprediction is encountered, fetch unit 200 can cause processor 102 to perform an immediate flush of improperly fetched instructions and other processor mechanisms (e.g., instruction tracking and control mechanisms) in processor 102, and fetch unit 200 can commence fetching instructions from the proper location in program code. As shown in FIG. 2, fetch unit 200 is coupled to exemplary signal lines that carry signals from and to the other units in processor 102 to indicate when the flush is to be performed. The detection of mispredictions of backward-branching instruction in vector partitioning loops and the flush of processor 102 are described in more detail below.

Decode unit 202 decodes the instructions and assembles executable instructions to be sent to the execution units, and dispatch unit 204 receives decoded instructions from decode unit 202 and dispatches the decoded instructions to the appropriate execution unit. For example, dispatch unit 204 can dispatch branch instructions to branch execution unit 206, integer instructions to integer execution unit 208, etc.

Figure 5:
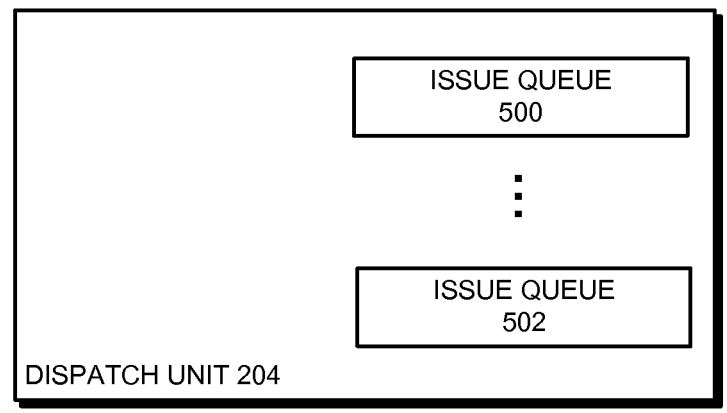
FIG. 5 presents a block diagram illustrating issue queues in accordance with the described embodiments.

In some embodiments, dispatch unit 204 comprises one or more issue queues that are used for storing (i.e., buffering) instructions that are eventually to be issued to corresponding execution units for execution. FIG. 5 presents a block diagram illustrating issue queues 500-502 in accordance with the described embodiments. Issue queues 500-502 can be first-in-first-out ("FIFO") memory structures that are configured to issue a given number of instructions per cycle to a corresponding execution unit. For example, the issue queues can be configured to issue one instruction per cycle to a corresponding execution unit.

In the described embodiments, instructions buffered in the issue queue can be held in the issue queue for an unknown length of time when a prior instruction is unable to be executed immediately, or, more generally, when any operating condition occurs that causes processor 102 to hold instructions in the issue queue (i.e., during stalls, etc.). For example, when data is not yet available for a next instruction to be issued from the issue queue to a corresponding execution unit, the instruction may be held in the issue queue (or may be issued, but cause the execution unit to stall). When the condition that caused processor 102 to hold instructions in the issue queue resolves, instructions can resume issuing from the issue queues as described above.

Note that the arrangement of issue queues shown in FIG. 5 is exemplary. In some embodiments, dispatch unit 204 comprises more issue queues (as illustrated by the ellipses in FIG. 5). For example, in some embodiments, dispatch unit 204 comprises at least one dedicated/separate issue queue for each execution unit.

Each of execution units 206-212 is used for performing computational operations, such as logical operations, mathematical operations, or bitwise operations for an associated type of operand or operation. More specifically, integer execution unit 208 is used for performing computational operations that involve integer operands, floating-point execution unit 212 is used for performing computational operations that involve floating-point operands, vector execution unit 210 is used for performing computational operations that involve vector operands, and branch execution unit 206 is used for performing operations for resolving branches. Integer execution units and floating-point execution units are generally known in the art and are not described in more detail.

Figure 3:
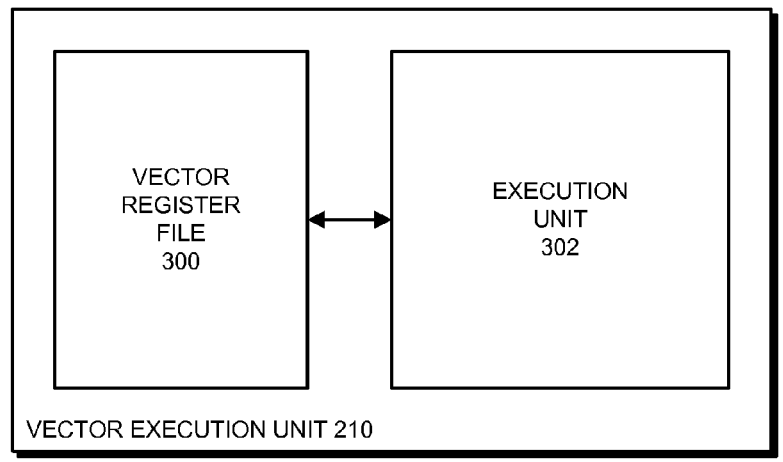
FIG. 3 presents an expanded view of a vector execution unit in accordance with the described embodiments.

In the described embodiments, vector execution unit 210 is a single-instruction-multiple-data (SIMD) execution unit that performs operations in parallel on some or all of the data elements that are included in vectors of operands. FIG. 3 presents an expanded view of vector execution unit 210 in accordance with the described embodiments. As is shown in FIG. 3, vector execution unit 210 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

Vector execution unit 302 retrieves operands from registers in vector register file 300 and executes vector instructions that cause execution unit 302 to perform operations in parallel on some or all of the data elements (or, simply, "elements") in the operand vector. For example, execution unit 302 can perform logical operations, mathematical operations, or bitwise operations on the elements in the vector. Execution unit 302 can perform one vector operation per cycle (although the "cycle" may include more than one cycle of a clock used to trigger, synchronize, and/or control execution unit 302's computational operations).

In the described embodiments, execution unit 302 supports vectors that hold N data elements (e.g., bytes, words, double-words, etc.). In these embodiments, execution unit 302 can perform operations on Nor fewer of the data elements in an operand vector in parallel. For example, assuming an embodiment where the vector is 256 bits in length (i.e., 32 bytes), the data elements being operated on are four-byte words, and the operation is adding a value to the data elements, these embodiments can add the value to any number of the eight words in the vector.

In the described embodiments, execution unit 302 includes at least one control signal that enables the dynamic limitation of the data elements in an operand vector on which execution unit 302 operates. Specifically, depending on the state of the control signal, execution unit 302 may or may not operate on all the data elements in the vector. For example, assuming an embodiment where the vector is 512 bits in length and the data elements being operated on are four-byte words, the control signal can be asserted to prevent operations from being performed on some or all of 16 data words in the operand vector. Note that "dynamically" limiting the data elements in the operand vector upon which operations are performed can involve asserting the control signal separately for each cycle at runtime.

In some embodiments, based on the values contained in a vector of predicates or one or more scalar predicates, execution unit 302 applies vector operations to selected vector data elements only. In some embodiments, the remaining data elements in a result vector remain unaffected (which we call "predication") or are forced to zero (which we call "zeroing"). In some of these embodiments, the clocks for the data element processing subsystems ("lanes") that are unused due to predication or zeroing in execution unit 302 can be gated, thereby reducing dynamic power consumption in execution unit 302.

The described embodiments are vector-length agnostic. Thus, a compiler or programmer need not have explicit knowledge of the vector length supported by the underlying hardware (e.g., vector execution unit 302). In these embodiments, a compiler generates or a programmer writes program code that need not rely on (or use) a specific vector length (some embodiments are forbidden from even specifying a specific vector size in program code). Thus, the compiled code in these embodiments (i.e., binary code) runs on other embodiments with differing vector lengths, while potentially realizing performance gains from processors that support longer vectors. Consequently, as process technology allows longer vectors, execution of legacy binary code simply speeds up without any effort by software developers.

In some embodiments, vector lengths need not be powers of two. Specifically, vectors of 3, 7, or another number of data elements can be used in the same way as vectors with power-of-two numbers of data elements.

In the described embodiments, each data element in the vector can contain an address that is used by execution unit 302 for performing a set of memory accesses in parallel. In these embodiments, if one or more elements of the vector contain invalid memory addresses, invalid memory-read operations can occur. In these embodiments, invalid memory-read operations that would otherwise result in program termination instead cause any elements with valid addresses to be read and elements with invalid elements to be flagged, allowing program execution to continue in the face of speculative, and in hindsight illegal, read operations.

In some embodiments, processor 102 (and hence execution unit 302) is able to operate on and use vectors of pointers. In these embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

Branch execution unit 206 receives branch instructions and performs operations for resolving the branch instructions to determine if the branch should be "taken" or "not taken." For example, in some embodiments, branch execution unit can receive a BranchCarryClear instruction and perform a comparison operation to determine if a corresponding carry flag (CF) in processor 102 is set or clear, and can accordingly determine that the branch is to be taken or not taken. Branch execution unit 206 can then signal one or more other units in processor 102 to indicate the outcome of a branch instruction. For example, FIG. 2 shows a signal line from branch execution unit 206 to fetch unit 200 for signaling fetch unit 200 regarding the outcome of a branch instruction, but any number of units can be signaled.

Figure 4:
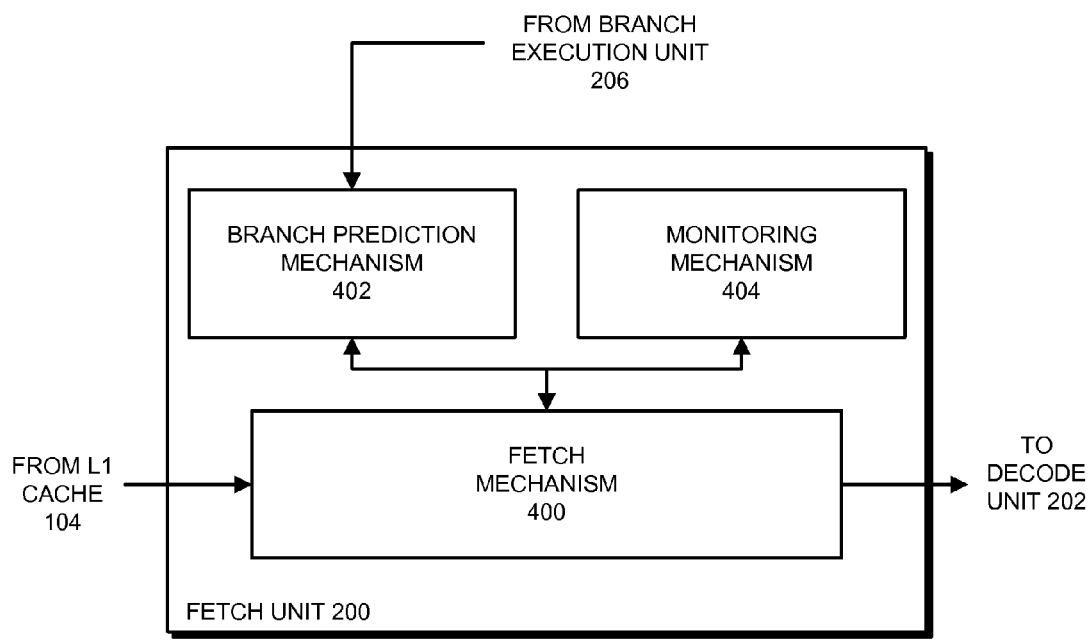
FIG. 4 presents an expanded view of a fetch unit in accordance with the described embodiments.

FIG. 4 presents an expanded view of fetch unit 200 in accordance with the described embodiments. As shown in FIG. 4, fetch unit 200 comprises fetch mechanism 400, branch prediction mechanism 402, and monitoring mechanism 404. Fetch mechanism 400 performs operations for determining an address for a next instruction (or addresses for a next set of instructions) and requesting the instruction from L1 cache 104 and/or from other levels of the memory hierarchy. In some embodiments, this can include maintaining a program counter (PC) that is incremented or otherwise updated and used to fetch the next instruction or set of instructions.

Branch prediction mechanism 402 comprises one or more mechanisms for predicting the results of branch instructions. When a branch instruction (or, more generally, a conditional control transfer instruction) is fetched while fetching program code, branch prediction mechanism 402 determines if a prediction is available for the branch. For example, in some embodiments, branch prediction mechanism 402 can perform a lookup in a branch prediction table (not shown) for the branch prediction. When a prediction is available, branch prediction mechanism 402 can predict the outcome of the branch. In some embodiments, if a prediction is not available, branch prediction mechanism 402 can make a default prediction.

If the prediction is that the branch is taken, fetch mechanism 400 can use an address from the branch instruction (which may need to be computed by fetch unit 200) to update the program counter, and can commence speculatively fetching instructions from the updated program counter. Otherwise, if the prediction is that the branch is not taken, fetch mechanism 400 can continue speculatively fetching instructions from a current program counter. Note that the instructions are "speculatively" fetched because the prediction may turn out to be incorrect, and the speculative instructions may need to be flushed (e.g., invalidated or removed) from processor 102.

As described above, branch execution unit 206 can signal branch prediction mechanism 402 when an actual result has been calculated for a branch instruction. Branch prediction mechanism 402 can then determine if the actual result of a branch instruction computed by branch execution unit 206 matches the result predicted by branch prediction mechanism 402 (here it is assumed that the branch was predicted). If so, branch prediction mechanism 402 allows fetch mechanism 400 to continue to fetch instructions following the branch prediction and may also update the lookup table accordingly. Otherwise, if the actual result of the branch instruction differs from the predicted result, i.e., a branch misprediction has occurred, fetch unit 200 flushes instructions that were speculatively fetched following the prediction of the branch result from processor 102 (e.g., from the other units in processor 102), updates the program counter using the actual result of the branch instruction, and commences fetching instructions using the updated program counter for execution. Branch prediction mechanism 402 can also update the lookup table using the actual result.

Note that, although branch prediction mechanism 402 functions generally as described, numerous other aspects, techniques, and operations for predicting branches are known in the art. However, for clarity, aside from the operations herein described, the operations of branch prediction mechanism 402 are not described in detail.

Monitoring mechanism 404 comprises one or more mechanisms for determining when a backward-branching instruction at the end of a vector partitioning loop has been mispredicted after the last iteration of the vector partitioning loop, and handling the misprediction. In some embodiments, making this determination comprises determining how many iterations of the vector partitioning loop are to be executed to safely process each of the elements in the vector instructions, and determining how many of the backward-branching instructions have been predicted as taken (with each taken backward-branching instruction commencing another iteration of the vector partitioning loop). When the number of backward-branching instructions predicted as taken is larger than the number of iterations of the vector partitioning loop that are to be executed, monitoring mechanism 404 determines that at least one backward-branching instruction has been mispredicted. In some embodiments, monitoring mechanism 404 uses a SegCount instruction that is executed at the beginning of the vector partitioning loop to determine the number of iterations of the vector partitioning loop that are to be executed.

Upon determining that a backward-branching instruction has been mispredicted, monitoring mechanism 404 can immediately cause processor 102 to flush instructions at and after the backward-branching instruction from processor 102 (i.e., from any unit in processor 102 from fetch unit 200 to the execution units 206-212), as well as flushing/clearing/invalidating other processor mechanisms (e.g., instruction tracking and control mechanisms). Fetch unit 200 can then begin fetching instructions from the correct location in program code. (Note that the correct location in program code can be a next instruction in program code following the backward-branching instruction, i.e., the next instruction after the vector partitioning loop in program code.) In this way, monitoring mechanism 404 can use an instruction such as the SegCount instruction to determine when instructions are being fetched based on mispredictions of one or more backward-branching instructions, and can immediately rectify the misprediction.

Although monitoring mechanism 404 is shown as part of fetch unit 200, in some embodiments, monitoring mechanism 404 can be a separate unit in processor 102, and/or some or all of monitoring mechanism 404 can be included in one or more other units in processor 102 (e.g., decode unit 202, etc.). Generally, monitoring mechanism 404 is located within processor 102 and/or communicates with the units in processor 102 to enable monitoring mechanism 404 to perform the above-described operations.

Although we describe processor 102 as including a particular set of units, in alternative embodiments, processor 102 can include different numbers or types of units. Moreover, although the embodiment shown in FIG. 2 is limited to a particular set of functional blocks, in the described embodiments, processor 102 can include other functional blocks, such as an instruction fetch unit, a branch unit, a memory management unit, I/O interfaces, etc. coupled to the execution units.

Vector Partitioning Loop

Recall that, in the described embodiments, a loop in program code can be vectorized by a compiler during compilation by replacing instructions in the loop in program code with vector instructions, so that each iteration of the loop in program code is represented by a corresponding element in the vector instructions. For example, individual mathematical, logical, memory access, etc. operations in the loop can be replaced with one or more vector instructions that can perform the operations for multiple loop iterations in parallel. When the vector instructions are subsequently executed, operations for multiple loop iterations can be performed by the vector instruction in parallel.

However, because loop iterations may have runtime data dependencies in which a later loop iteration depends on data generated by an earlier loop iteration, it may be incorrect to simply perform operations for a set of loop iterations in parallel using vector instructions. To ensure that iterations of the loop in program code are not improperly executed in parallel when the vector instruction is executed, the compiler can also insert control instructions that determine, based on run-time conditions and data that is not resolved until runtime, the iterations of the loop that are safe to execute in parallel. In addition, the compiler can insert a backward-branching instruction that branches back to the control instructions as long as one or more iterations of the loop remain to be executed (i.e., as long as one or more elements of the vector instructions remain to be processed).

When subsequently executed, the control instructions determine a set of elements of the vector instructions that can be operated on in parallel (because the corresponding loop iterations do not have runtime data dependencies). The vector instructions are then executed so that the operations are performed on these elements. After the vector instructions have been executed to perform the corresponding operation on the elements, the backward-branching instruction determines (e.g., checks a processor flag) if more vector instruction elements remain to be processed and, if so, branches back to the control instruction. For example, a GeneratePredicates instruction may be one of the control instructions, and the backward-branching instruction can check a "carry" flag that is set by the GeneratePredicates instruction to see if it is cleared (thereby indicating that there are more elements to be processed). Otherwise, if no elements remain to be processed, the loop is finished, and instructions following the loop are executed.

Together, the control instructions and the backward-branching instruction implement a "vector partitioning loop," which is a loop around the vector instructions that "partitions" the vector instructions into sets of elements that can be executed in parallel safely (because the underlying iterations of the loop in program code do not have runtime data dependencies). As an example of the operation of a vector partitioning loop, assume that a vector instruction of eight elements will be used to perform a corresponding operation for eight iterations of a loop in program code. Further assume that the fourth iteration of the loop has a runtime data dependency on the third iteration of the loop. In this case, the vector partitioning loop would iterate twice. For the first iteration, the vector control instructions determine that the first through the third elements can be operated on in parallel, and configure the vector instruction accordingly (e.g., by generating a predicate vector that enables only the first through the third iterations to execute in parallel). Because there are still elements upon which the vector instruction has not operated, the backward-branching instruction then causes processor 102 to branch back to the control instructions (i.e., to return to the start of the vector partitioning loop), thereby starting the second iteration. During the second iteration, the vector control instructions determine that the fourth through the eighth elements can be operated on in parallel, and configure the vector instruction accordingly. After the vector instructions have been executed for the fourth through eighth elements, because there are no remaining elements for the vector instruction to operate on, the backward-branching instruction falls through, and processor 102 begins fetching instructions following the backward-branching instruction, thereby departing/ending the vector partitioning loop.

Figure 6:
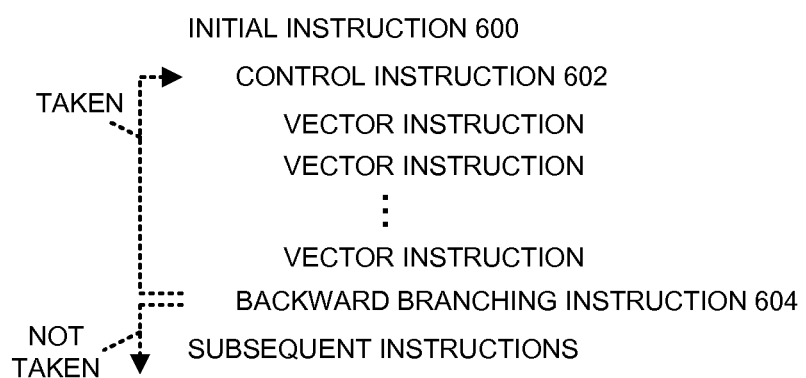
FIG. 6 presents an exemplary vector partitioning loop and corresponding vector instructions in accordance with the described embodiments.

FIG. 6 presents an exemplary vector partitioning loop and corresponding vector instructions in accordance with the described embodiments. As can be seen in FIG. 6, the vector partitioning loop includes control instruction 602 and backward branching instruction 604. Control instruction 602 (which can include any number of actual instructions) computes the elements of the vector instructions that can be safely operated on in parallel. This can include resolving runtime data dependencies, computing DIVs, analyzing the data dependencies/DIVs, and/or generating one or more indications of the elements of the vector instructions that can be safely operated on in parallel (one such indication is a predicate vector).

Note that the instructions in FIG. 6 are presented in a particular order only as an example, in some embodiments, some of the vector control instructions can occur before initial instruction 600. For example, the resolution of runtime data dependencies, the generation of a DIV, etc. can occur before initial instruction 600.

Backward-branching instruction 604 determines whether all of the elements in the vector instructions have been processed, and, if not, causes processor 102 to return along the "taken" branch to the control instructions to commence a next iteration. If all of the elements in the vector instructions have been processed, backward branching instruction 604 falls through along the "not taken" branch, and processor 102 executes subsequent instructions.

Some embodiments use initial instruction 600 to determine that execution of a vector partitioning loop has started. In these embodiments, processor 102 monitors for the initial instruction 600 in program code being executed, and determines that the vector partitioning loop has started when such an instruction is encountered (and can start counting predicted backward-branching instructions). For example, some embodiments can use the SegCount instruction as initial instruction 600, and processor 102 (e.g., monitoring mechanism 404) can start counting backward-branching instruction upon encountering a SegCount instruction. In alternative embodiments may use additional or different techniques, such as program counters, instruction patterns, etc. to determine that execution of a vector partitioning loop has started.

Branch Prediction and the Backward-Branching Instruction in the Vector Partitioning Loop As described above, branch prediction mechanism 402 predicts the result of branch instructions while instructions are fetched in fetch unit 200 to enable instructions following branch instructions to be speculatively fetched before the branch instruction is actually resolved in branch execution unit 206. In the same way as other branch instructions, a result for the backward-branching instruction at the end of a vector partitioning loop can be predicted by branch prediction mechanism 402. Thus, upon fetching the backward-branching instruction at the end of a vector partitioning loop, branch prediction mechanism 402 can predict the backward-branching instruction taken or not taken, and fetch unit 200 fetches subsequent instructions based on the prediction.

Additionally, as described above, processor 102 can buffer instructions in instruction queues 500-502, where the instructions can be held before they are issued for execution in the corresponding execution units in FIFO order. During operation, instructions can build up in issue queues 500-502, waiting for a stalled instruction/execution unit, resolution of data dependencies, etc., before they can issue to the corresponding execution unit. In some cases, a large number of instructions can be held in one or more of issue queues 500-502 awaiting issue. The instructions that can be held up in issue queues 500-502 can comprise instructions for a number of iterations of the vector partitioning loop, including predicted-taken backward-branching instructions from the end of the vector partitioning loop. Because this is true, in some cases, fetch unit 200 can fetch instructions for the vector partitioning loop based on multiple predicted backward-branching instructions that are buffered in issue queues 500-502, but have not yet been executed to determine the actual result (and hence to enable the determination if the prediction was incorrect), potentially meaning that numerous incorrectly-fetched instructions are buffered in issue queues 500-502, awaiting issue to the corresponding execution units.

As described herein, upon determining that a backward-branching instruction has been mispredicted as taken after the end of a vector partitioning loop, processor 102 can flush the predicted backward-branching instructions and instructions fetched on the predicted backward-branching instructions from the processor. Specifically, processor 102 can locate mispredicted backward-branching instructions and subsequently fetched instructions that are buffered in the issue queues 500-502, as well as instructions in earlier units (decode unit 202, etc.) and can flush these instructions from the processor 102.

Tracking Backward-Branching Instructions

In some embodiments, during operation, monitoring mechanism 404 monitors fetched instructions to determine when an initial instruction in a vector partitioning loop has been fetched. For example, when a SegCount instruction has been fetched. Upon fetching the initial instruction, monitoring mechanism 404 begins to keep track of the number of backward branching instructions that are fetched by fetch unit 200. In these embodiments, detecting the initial instruction can comprise using program counters, opcodes, memory locations, etc. to identify the initial instruction. For example, in some embodiments, processor 102 dynamically records where SegCount instructions are located in memory and/or program counters at which SegCount instructions are located at to enable the detection of the SegCount instructions. Recall that some or all of monitoring mechanism 404 can be located in a unit in processor 102 where the SegCount instruction has been resolved enough to read the opcode, determine the program counter at which the SegCount instruction is located, etc. (e.g., fetch unit 200, decode unit 202, etc.).

When tracking backward-branching instructions, processor 102 (e.g., monitoring mechanisms) can monitor opcodes, program counters, etc. to determine when a backward-branching instruction has been encountered and can increment a backward-branching instruction counter each time that a backward-branching instruction is encountered. In the same way as with the initial instruction, in some embodiments, processor 102 can dynamically keep a record of where backward-branching instructions are located in program code and can use the record to detect backward-branching instructions when they are subsequently fetched.

In some embodiments, processor 102 detects when an actual result for a backward-branching instruction in a vector partitioning loop is not-taken, and hence a last iteration of the vector partitioning loop is finished, and clears the backward-branching instruction count. The backward-branching instruction count can also be cleared when a misprediction of the backward-branching instruction is detected using the techniques herein described. More specifically, upon determining that a backward-branching instruction has been mispredicted by comparing the count of predicted-taken backward-branching instructions to the number of iterations of the vector partitioning loop, along with the flushing operation, the count of backward-branching instructions can be cleared (i.e., set to zero or another predetermined value).

Process for Executing Program Code

Figure 7:
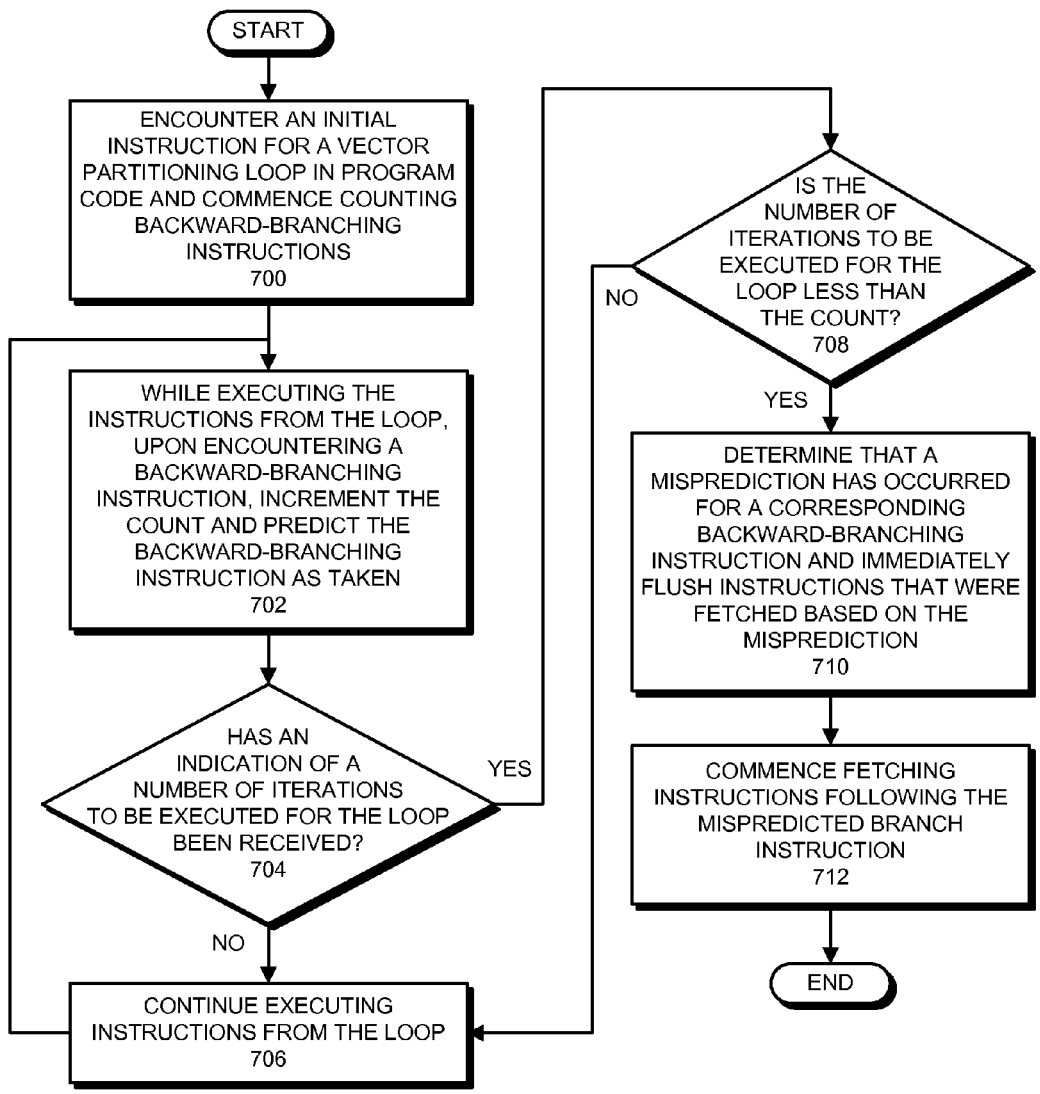
FIG. 7 presents a flowchart illustrating a process for executing program code in accordance with the described embodiments.

FIG. 7 presents a flowchart illustrating a process for executing program code in accordance with the described embodiments. As shown in FIG. 7, the process starts when processor 102 encounters an initial instruction for a vector partitioning loop in program code and commences counting backward-branching instructions (step 700). Recall that a vector partitioning loop is a loop in program code that determines a next set elements of one or more corresponding vector instructions can be operated on in parallel safely until all of the elements of the vector instructions have been operated on. Additionally recall that the vector partitioning loop typically includes at least: (1) one or more vector instructions that perform an operation for a set of elements, where each element represents an iteration of an underlying loop in program code; (2) one or more control instructions for determining a next set of elements of the vector instructions for which operations can safely be performed in parallel; and (3) a backward branching instruction that branches back to the control instructions to start the next iteration of the vector partitioning loop until all of the elements of the vector instructions have been operated on.

In some embodiments, the initial instruction in the vector partitioning loop is a SegCount instruction. As described above, the SegCount instruction is an instruction that can be used to determine a number of "segments" to be used for performing one or more vector operations for the elements of a vector instruction, where each segment is a portion (i.e., a set of one or more elements) of the vector instruction for which operations can be safely performed in parallel. For an N-element vector instruction, the SegCount instruction can return any value from 1, in the case that all of the elements of the vector instruction can be processed in parallel, to N, in the case that each of the elements of the vector instruction must be processed serially (and a value between 1 and N when at least some of the elements of the vector instruction can be processed in parallel). When used for the vector partitioning loop, the SegCount instruction determines a number of iterations of the vector partitioning loop needed to process each element of the corresponding vector instructions.

In some embodiments, the program code comprises one or more instructions for computing a dependency index vector (DIV) before the SegCount instruction in program code. For example, these instructions can include ConditionalStop instruction or another instruction. Generally, the DIV is a vector that indicates dependencies between iterations of an underlying loop of program code, and hence vector instruction elements for which parallel execution may cause an error. The SegCount instruction takes the DIV as an input.

Note that, although the SegCount instruction is used in describing the operations performed in FIG. 7, alternative embodiments may use a different instruction (or instructions). Generally, the described embodiments can use any instruction(s) that can determine a number of iterations of the vector partitioning loop for performing the operations for each of the elements of the corresponding vector instructions.

Additionally, "encountering the initial instruction in the vector partitioning loop" comprises fetching the instruction and processing the instruction sufficiently enough to recognize the instruction as the initial instruction in a vector partitioning loop. Although this operation is described above as occurring in fetch unit 200, in some embodiments, some or all of this operation occurs in a different unit in processor 102. For example, some or all of this operation can occur in decode unit 202. Generally, this operation can occur in any mechanism or unit where the initial instruction from the vector partitioning loop can be recognized using its opcode/the program counter/etc., can be looked up in a table, and/or can otherwise be identified as the initial instruction in the vector partitioning loop.

In some embodiments, commencing counting backward-branching instructions comprises configuring fetch unit 200 to keep a count of any backward-branching instruction encountered after starting to count. In some embodiments, this comprises counting each branch instruction with a target that is earlier in program code than the current program counter. Alternative embodiments can keep a count of a given variant (or variants) of branch instruction (BranchCarryClear, etc.) and/or may use other techniques to keep a record of backward-branching instructions. Generally, the described embodiments can use any technique that enables processor 102 to maintain a record that enables processor 102 to determine a number of backward-branching instructions encountered while executing the vector partitioning loop. In some embodiments, processor 102 counts backward-branching instruction that have been predicted as taken and/or have otherwise resulted in the return to the control instructions (e.g., when a backward-branching instruction is mispredicted and processor 102 recovers).

Along with mechanisms for counting backward-branching instructions, processor 102 comprises mechanisms for determining where in processor 102 a given backward-branching instruction is located within processor 102 as the backward-branching instruction proceeds through processor 102 toward branch execution unit 212. These mechanisms can include tags, indicators, etc. that are carried along with backward-branching instructions as the backward-branching instructions progress through different units in processor 102. These mechanisms can also include tags, a table, and/or other indicators that can be used to locate a given backward-branching instruction within issue queues 500-502. As described below, processor 102 can use these mechanisms to find a particular mispredicted branch instruction from among the counted branch instructions within processor 102 to enable the flush of instructions that were incorrectly fetched based on a misprediction. Specifically, given an identification for one of the counted backward-branching instruction (e.g., the second, twelfth, or the Ith of M counted branch instructions), processor 102 can use these mechanisms to locate the backward-branching instruction within processor 102, including within the issue queues.

Returning to FIG. 7, as shown in step 702, while executing the instructions from the loop, upon encountering a backward-branching instruction, processor 102 increments the count of backward-branching instructions and predicts the backward branch as taken (step 702). For this example, it is assumed that processor 102 predicts the backward branch as taken, so that program flow returns to the control instructions at the beginning of the vector partitioning loop, and hence fetch unit 200 fetches the control instructions (and subsequent instructions) for execution to start another iteration of the vector partitioning loop. As described above, this prediction can be made branch prediction mechanism 402. Note that processor 102/branch prediction mechanism 402 does not always/automatically predict every backward-branching instruction as taken, however, for the sake of this example, it is assumed that the backward-branching instruction is predicted as taken.

As described above, processor 102 can buffer decoded instructions in instruction queues 500-502 to await dispatch to the corresponding execution units. For the remainder of this example, it is assumed that processor 102 buffers the backward-branching instruction in issue queues 500-502, where the backward-branching instruction is held behind one or more prior instructions. More specifically, it is assumed that the backward-branching instruction proceeds through the units (i.e., fetch unit 200, decode unit 202) in processor 102, but is held in the issue queue 500-502 and does not proceed to branch execution unit 212.

While executing the vector partitioning loop (and the corresponding vector instructions) processor 102 eventually receives an indication of a number of iterations of the vector partitioning loop needed to process each element of the corresponding vector instructions. For example, processor 102 can receive a result from the SegCount instruction that was encountered at the beginning of the vector partitioning loop or another instruction or operation. If the indication of a number of iterations to be executed for the vector partitioning loop has not been received (step 704), processor 102 continues executing instructions from the vector partitioning loop (including the corresponding vector instructions) (step 706) and returns to step 702. Note that, in some embodiments, the result of the SegCount instruction may be used internally in processor 102 and hence may not be written to memory or otherwise used aside from as herein described.

Note that returning to step 702 can occur a number of times before the indication of the number of iterations is received, and hence, as described above, a number of predicted-taken backward-branching instructions may be held in issue queues 500-502. For the remainder of this example, it is assumed that processor 102 performs the operation in step 702 multiple times, and hence a corresponding number of backward-branching instructions are held in the issue queue. In the described embodiments, this can occur when multiple iterations of the vector partitioning loop have been executed before the result of the SegCount instruction returns.

When the indication of a number of iterations to be executed for the vector partitioning loop is received (step 704), processor 102 determines if the number of iterations to be executed for the vector partitioning loop is less than the count (step 708). If the number of iterations to be executed for the vector partitioning loop is more than the count, processor 102 continues executing instructions from the vector partitioning loop (including the corresponding vector instructions) (step 706) and hence returns to step 702. Note that the number of iterations to be executed for the vector partitioning loop is more than the count when the number of backward-branching instructions counted by processor 102 is less than the number of iterations needed to perform the operations for each element of the vector instructions. Hence, processor 102 has not yet mispredicted a backward-branching instruction as being taken, and so the predicted backward branches from the vector partitioning loop in processor 102 are all correctly predicted to return to the control instructions at the beginning of the vector partitioning loop (i.e., to start another iteration of the vector partitioning loop).

In the event that the number of iterations to be executed for the vector partitioning loop is more than the count and processor 102 continues executing instructions from the loop, processor 102 can store the number of iterations to be executed for the vector partitioning loop and compare the number of iterations to be executed for the vector partitioning loop to the count of predicted backward-branching instructions at a future time. For example, each time a subsequent backward-branching instruction is predicted, processor 102 can determines if the number of iterations to be executed for the vector partitioning loop is less than the count (step 708). In these embodiments, when the number of iterations to be executed for the vector partitioning loop is less than the count, processor 102 can determine that a misprediction has occurred for a corresponding backward-branching instruction and immediately flush instructions that were fetched based on the misprediction (step 710), as described below.

On the other hand, if the number of iterations to be executed for the vector partitioning loop is less than the count, processor 102 can determine that a misprediction has occurred for a corresponding backward-branching instruction and immediately flush instructions that were fetched based on the misprediction (step 710). In contrast to the case described above, the number of iterations to be executed for the vector partitioning loop is less than the count when the number of backward-branching instructions counted (and predicted taken) by processor 102 is more than the number of iterations needed to perform the operations for each element of the vector instructions. Hence, processor 102 has mispredicted at least one backward-branching instruction. The affect of such a misprediction is that instruction execution is incorrectly assumed to return to the control instructions at the beginning of the vector partitioning loop, thereby starting another iteration of the vector partitioning loop, when, in reality, a prior iteration of the vector partitioning loop was the final iteration of the vector partitioning loop.

When immediately flushing the instructions that were fetched based on the misprediction, processor 102 first determines where in processor 102 the mispredicted backward-branching instruction is located. To make this determination, processor 102 determines a first of the backward-branching instructions that was mispredicted (because multiple backward-branching instructions may have been mispredicted). For example, processor 102 can determine the Kth predicted backward-branching instruction, where K is equal to the result returned from the SegCount instruction. Because K−1 backward-branching instruction should be taken in order to return instruction execution to the control instructions at the beginning of the vector partitioning loop the correct number of times, the Kth predicted backward-branching instruction is the first mispredicted backward-branching instruction. After determining the first of the mispredicted backward-branching instructions, processor 102 uses the above-described mechanisms to locate the first mispredicted backward-branching instruction in processor 102 and flushes the first mispredicted backward-branching instruction and any instructions fetched after it from processor 102. In the described embodiments, flushing these instructions comprises invalidating, deleting, and/or otherwise causing these instructions to be ignored in processor 102.

As described above, it has been assumed for this example that processor 102 buffered one or more mispredicted backward-branching instruction in the instruction issue queues. Hence, locating the first mispredicted instruction in processor 102 comprises using mechanisms (tags, tables, etc.) in and/or associated with the issue queues to locate the instructions in the issue queues fetched after the mispredicted branch instruction. In addition, flushing the instructions fetched after the mispredicted backward-branching instruction from processor 102 comprises deleting, invalidating, or otherwise causing processor 102 to ignore these instructions in the issue queue, as well as flushing any instructions fetched after the mispredicted backward-branching instruction from the other units (decode unit 202, etc.) in processor 102 and possibly clearing other mechanisms (instruction tracking mechanisms, state variables, etc.) in processor 102.

After performing the flush operation in step 710, processor 102 commences fetching instructions following the branch instruction (step 712). In the described embodiments, this operation can include fetching instructions from a program counter immediately after the backward-branching instruction (i.e., not taking or "falling through" the backward-branching instruction). Because the incorrectly fetched instructions following the mispredicted backward-branching instruction have been flushed from processor 102, these instructions can flow through the units of processor 102 to the execution units for instruction. Note that, by not taking the branch instruction, these embodiments correctly depart the vector partitioning loop after the last iteration of the vector partitioning loop (i.e., after a last element has been processed for the corresponding vector instructions).

In existing systems, in order to discover a mispredicted backward-branching instruction, it is necessary to execute the backward-branching instruction in branch execution unit 212 and return an actual result to branch prediction mechanism 402, which determines if the predicted result matches the actual result. This operation takes time, meaning that many instructions can be fetched before the misprediction is discovered or a relatively long delay can occur before processor 102 begins fetching the proper instructions. Unlike existing systems, the flushing operation in the described embodiments can occur without the mispredicted branch instruction at the end of the vector partitioning loop having been executed to generate an actual result of the backward-branching instruction and without requiring that branch prediction mechanism 402 determine if the predicted result differs from the actual result. More specifically, by using the SegCount instruction to determine the number of iterations of the vector partitioning loop that are to be executed, and then determining if a number of predicted-taken backward-branching instruction is larger than this number, the described embodiments can determine at an earlier time that one or more backward-branching instructions have been mispredicted. In fact, in the described embodiments, the mispredicted backward branching instruction can be located anywhere from the fetch unit to the issue queues when the determination is made, having never been dispatched to the branch execution unit 206 for execution before the flush operation is performed.

The foregoing descriptions have been presented only for purposes of illustration and description. They are not intended to be exhaustive or to limit the described embodiments to the forms disclosed. Accordingly, many modifications and variations will be apparent to practitioners skilled in the art. Additionally, the above disclosure is not intended to limit the described embodiments. The scope of these embodiments is defined by the appended claims.

What is claimed is:

1. A method for executing instructions in a vector processor, comprising:
   while fetching instructions from program code in the processor, repeatedly:
      starting from an initial instruction in a loop in the program code, fetching instructions from the loop; and
      upon fetching a branch instruction from the loop that, when taken, causes the processor to branch back to the initial instruction, incrementing a branch instruction counter and predicting the branch instruction as taken, causing the processor to return to the initial instruction and continue fetching instructions from the loop;
   while fetching the instructions from the loop, calculating a number of times that the branch instruction will actually be taken when the fetched instructions are executed, wherein calculating the number of times that the branch instruction will actually be taken comprises receiving a dependency index vector (DIV) for the loop in the program code, the DIV indicating dependencies between iterations for the loop of program code, and executing a SegCount instruction with the DIV as an input, wherein an output of the SegCount instruction indicates number of times that the branch instruction will actually be taken; and
   upon determining that the branch instruction counter is greater than the number of times that the branch instruction will actually be taken, immediately commencing a mispredict operation for the branch instruction, which comprises:
      flushing fetched instructions from the loop that will not be executed from the processor; and
      commencing fetching instructions from an instruction following the branch instruction.

2. The method of claim 1, wherein the method further comprises:
   placing the fetched instructions in one or more issue queues, wherein instructions are buffered in the one or more issue queues before being issued for execution;
   wherein flushing fetched instructions from the loop that will not be executed from the processor comprises flushing instructions from at least one of the one or more issue queues and clearing other instruction-tracking mechanisms in the processor after a first instance in the issue queue of the branch instruction that will not be taken.

3. The method of claim 1, wherein the method further comprises:
   encountering a SegCount instruction;
   based on encountering the SegCount instruction, determining that the processor is about to, starting from the initial instruction, commence fetching instructions from the loop; and
   configuring the processor to increment the branch instruction counter upon fetching a branch instruction that branches backward in the program code.

4. The method of claim 1, wherein immediately commencing the mispredict operation for the branch instruction comprises commencing the mispredict operation without executing the branch instruction to determine that the branch was mispredicted.

5. The method of claim 1, wherein flushing fetched instructions from the loop that will not be executed from the processor comprises:
   determining a location of a first mispredicted branch instruction within the processor; and
   flushing the first mispredicted branch instruction and any instructions fetched after the first mispredicted branch instruction from the processor.

6. The method of claim 1, wherein commencing fetching instructions from the instruction following the branch instruction comprises:
   updating a program counter from an initial value to the value where the instruction following the branch instruction is located; and
   using the updated program counter to fetch subsequent instructions.

7. The method of claim 1, wherein the method further comprises:
   upon determining that the branch instruction counter is less than the number of times that the branch instruction will actually be taken, continuing to fetch instructions from the loop in program code.

8. A processor for executing program code, comprising:
   an execution unit, wherein the execution unit is configured to:
      while fetching instructions from program code, repeatedly:
         starting from an initial instruction in a loop in the program code, fetch instructions from the loop; and
         upon fetching a branch instruction from the loop that, when taken, causes the processor to branch back to the initial instruction, increment a branch instruction counter and predict the branch instruction as taken, causing the processor to return to the initial instruction and continue fetching instructions from the loop;
      while fetching the instructions from the loop, calculate a number of times that the branch instruction will actually be taken when the fetched instructions are executed, wherein calculating the number of times that the branch instruction will actually be taken comprises receiving a dependency index vector (DIV) for the loop in the program code, the DIV indicating dependencies between iterations for the loop of program code, and executing a SegCount instruction with the DIV as an input, wherein an output of the SegCount instruction indicates number of times that the branch instruction will actually be taken; and
      upon determining that the branch instruction counter is greater than the number of times that the branch instruction will actually be taken, immediately commence a mispredict operation for the branch instruction, which comprises:
         flushing fetched instructions from the loop that will not be executed from the processor; and
         commencing fetching instructions from an instruction following the branch instruction.

9. The processor of claim 8, wherein the execution unit is configured to place the fetched instructions in one or more issue queues, wherein instructions are buffered in the one or more issue queues before being issued for execution; and wherein, when flushing fetched instructions from the loop that will not be executed from the processor, the execution unit is configured to flush instructions from at least one of the one or more issue queues and clear other instruction-tracking mechanisms after a first instance in the issue queue of the branch instruction that will not be taken.

10. The processor of claim 8, wherein the execution unit is configured to:

encounter a SegCount instruction;

based on encountering the SegCount instruction, determine that the execution unit is about to, starting from the initial instruction, commence fetching instructions from the loop; and configuring the execution unit to increment the branch instruction counter upon fetching a branch instruction that branches backward in the program code.

11. The processor of claim 8, wherein, when immediately commencing the mispredict operation for the branch instruction, the execution unit is configured to commence the mispredict operation without executing the branch instruction to determine that the branch was mispredicted.

12. The processor of claim 8, wherein, when flushing fetched instructions from the loop that will not be executed from the processor, the execution unit is configured to:

determine a location of a first mispredicted branch instruction within the processor; and flush the first mispredicted branch instruction and any instructions fetched after the first mispredicted branch instruction from the processor.

13. The processor of claim 8, wherein, when commencing fetching instructions from the instruction following the branch instruction, the execution unit is configured to:

update a program counter from an initial value to the value where the instruction following the branch instruction is located; and use the updated program counter to fetch subsequent instructions.

14. The processor of claim 8, wherein upon determining that the branch instruction counter is less than the number of times that the branch instruction will actually be taken, the execution unit is configured to continue to fetch instructions from the loop in program code.

15. A computer system for executing program code, comprising:

a processor;

a memory coupled to the processor that stores data and instructions for the processor;

at least one execution unit in the processor configured to
while fetching instructions from program code, repeatedly:

starting from an initial instruction in a loop in the program code, fetch instructions from the loop; and upon fetching a branch instruction from the loop that, when taken, causes the processor to branch back to the initial instruction, increment a branch instruction counter and predict the branch instruction as taken, causing the processor to return to the initial instruction and continue fetching instructions from the loop;

while fetching the instructions from the loop, calculate a number of times that the branch instruction will actually be taken when the fetched instructions are executed, wherein calculating the number of times that the branch instruction will actually be taken comprises receiving a dependency index vector (DIV) for the loop in the program code, the DIV indicating dependencies between iterations for the loop of program code, and executing a SegCount instruction with the DIV as an input, wherein an output of the SegCount instruction indicates number of times that the branch instruction will actually be taken; and upon determining that the branch instruction counter is greater than the number of times that the branch instruction will actually be taken, immediately commence a mispredict operation for the branch instruction, which comprises:

flushing fetched instructions from the loop that will not be executed from the processor; and commencing fetching instructions from an instruction following the branch instruction.

16. The computer system of claim 15, wherein the execution unit is configured to place the fetched instructions in one or more issue queues, wherein instructions are buffered in the one or more issue queues before being issued for execution; and wherein, when flushing fetched instructions from the loop that will not be executed from the processor, the execution unit is configured to flush instructions from at least one of the one or more issue queues and clear other instruction-tracking mechanisms after a first instance in the issue queue of the branch instruction that will not be taken.

17. The computer system of claim 15, wherein the execution unit is configured to:

encounter a SegCount instruction;

based on encountering the SegCount instruction, determine that the execution unit is about to, starting from the initial instruction, commence fetching instructions from the loop; and configuring the execution unit to increment the branch instruction counter upon fetching a branch instruction that branches backward in the program code.

18. The computer system of claim 15, wherein, when immediately commencing the mispredict operation for the branch instruction, the execution unit is configured to commence the mispredict operation without executing the branch instruction to determine that the branch was mispredicted.

19. The computer system of claim 15, wherein, when flushing fetched instructions from the loop that will not be executed from the processor, the execution unit is configured to:

determine a location of a first mispredicted branch instruction within the processor; and flush the first mispredicted branch instruction and any instructions fetched after the first mispredicted branch instruction from the processor.

20. The computer system of claim 15, wherein, when commencing fetching instructions from the instruction following the branch instruction, the execution unit is configured to:

update a program counter from an initial value to the value where the instruction following the branch instruction is located; and use the updated program counter to fetch subsequent instructions.

21. The computer system of claim 15, wherein upon determining that the branch instruction counter is less than the number of times that the branch instruction will actually be taken, the execution unit is configured to continue to fetch instructions from the loop in program code.

* * * * *